(12) United States Patent
Kraus et al.

(10) Patent No.: US 8,366,892 B2
(45) Date of Patent: Feb. 5, 2013

(54) GRAPHITE ELECTRODE

(75) Inventors: Heinz Kraus, Zeilam (DE); Mikhail Sofin, Burghausen (DE)

(73) Assignee: Wacker Chemie AG, Munich (DE)

( * ) Notice: Subject to any disclaimer, the term of this patent is extended or adjusted under 35 U.S.C. 154(b) by 198 days.

(21) Appl. No.: 13/044,107

(22) Filed: Mar. 9, 2011

(65) Prior Publication Data
US 2011/0229658 A1    Sep. 22, 2011

(30) Foreign Application Priority Data

Mar. 19, 2010 (DE) .......................... 10 2010 003 064

(51) Int. Cl.
| | |
|---|---|
| *C25B 11/12* | (2006.01) |
| *C01B 33/02* | (2006.01) |
| *C01B 33/021* | (2006.01) |
| *C30B 23/00* | (2006.01) |
| *C30B 25/00* | (2006.01) |
| *C30B 25/12* | (2006.01) |
| *C30B 28/12* | (2006.01) |
| *C23C 14/14* | (2006.01) |
| *C23C 14/18* | (2006.01) |
| *C23C 16/24* | (2006.01) |

(52) U.S. Cl. .......... 204/294; 423/348; 423/349; 117/88; 117/87; 117/84; 117/98; 117/935; 427/255.27; 427/452; 427/563; 427/578

(58) Field of Classification Search .................. 204/294; 423/348, 349; 117/88, 87, 84, 98, 935; 427/255.27, 427/452, 563, 578
See application file for complete search history.

(56) References Cited

U.S. PATENT DOCUMENTS

| | | | |
|---|---|---|---|
| 1,444,961 A | 2/1923 | Eynon | |
| 3,676,324 A | 7/1972 | Mills | |
| 4,766,349 A * | 8/1988 | Johansson et al. | 313/631 |
| 5,284,640 A * | 2/1994 | Jernegan et al. | 423/349 |
| 6,639,192 B2 * | 10/2003 | Hertlein et al. | 219/541 |
| 2002/0088401 A1 * | 7/2002 | Hertlein et al. | 118/723 E |
| 2005/0094701 A1 | 5/2005 | Montminy et al. | |
| 2010/0058988 A1 * | 3/2010 | Endoh et al. | 118/725 |
| 2011/0226628 A1 * | 9/2011 | Kraus | 205/157 |
| 2011/0229717 A1 * | 9/2011 | Kraus | 428/375 |
| 2011/0274926 A1 * | 11/2011 | Oda et al. | 428/378 |
| 2012/0186300 A1 * | 7/2012 | Ishizaki et al. | 65/33.3 |
| 2012/0222619 A1 * | 9/2012 | Netsu et al. | 118/723 R |

FOREIGN PATENT DOCUMENTS

| | | |
|---|---|---|
| DE | 23 28 303 | 1/1975 |
| DE | 2435174 A1 | 2/1975 |
| EP | 0142476 A2 | 5/1985 |
| EP | 2161241 A2 | 3/2010 |

(Continued)

OTHER PUBLICATIONS

PatBase abstract for JP 2002338226.

(Continued)

*Primary Examiner* — Bruce Bell
(74) *Attorney, Agent, or Firm* — Caesar, Rivise, Bernstein, Cohen & Pokotilow, Ltd.

(57) ABSTRACT

The present invention relates to an electrode composed of carbon having at least two different zones, wherein an outer zone (A) forms the base of the electrode and carries one or more inner zones, wherein the innermost zone (B) projects from the zone (A) at the top and has a lower specific thermal conductivity than zone (A).

10 Claims, 2 Drawing Sheets

FOREIGN PATENT DOCUMENTS

| | | |
|---|---|---|
| GB | 2 135 334 A | 8/1984 |
| JP | 2002234720 A | 8/2002 |
| JP | 2002338226 A | 11/2002 |
| JP | 2005140325 A | 6/2005 |
| JP | 200616243 A | 1/2006 |
| JP | 2006240934 A | 9/2006 |
| JP | 201157970 A | 3/2011 |
| JP | 2011195438 A | 10/2011 |
| WO | 2011018964 A1 | 2/2011 |

OTHER PUBLICATIONS

PatBase abstract for JP 2006016243.
PatBase abstract for JP 2006240934.
PatBase abstract for DE 24 35 174.
Machine translation provided by PatBase for DE 23 28 303.

* cited by examiner

GRAPHITE ELECTRODE

BACKGROUND

The invention relates to an electrode composed of carbon having improved heat dissipation between electrode and workpiece.

Graphite electrodes are used in many different applications in industry. Examples thereof include aluminum and steel production, electrolysis of salt melts, electrolytic decomposition of chemical compounds, thermal deposition reactions, arc welding, measuring instruments and many more.

One important application in this case is the deposition of polysilicon according to the Siemens process, wherein high-purity elemental silicon is deposited from the gas phase on the surface of silicon rods. In this case, in a deposition reactor, from a mixture of hydrogen and halosilanes or a hydrogen-containing silicon compound, elemental silicon is deposited from the gas phase on the surface of a thin silicon rod heated to 900 to 1200° C.

In this case, the silicon rods are held in the reactor by specific electrodes, which generally consist of high-purity electrographite. In each case two thin rods having a different voltage polarity at the electrode mounts are connected at the other thin rod end by means of a bridge to form a closed electric circuit. Electrical energy for heating the thin rods is fed via the electrodes and the electrode mounts thereof. In this case, the diameter of the thin rods increases. At the same time, the electrode grows, starting at its tip, into the rod foot of the silicon rods. After a desired setpoint diameter of the silicon rods has been attained, the deposition process is ended, and the glowing silicon rods are cooled and demounted.

A particular importance is accorded here to the material and the shape of the electrodes. They serve, firstly, for retaining the thin rods, for transferring the current flow into the silicon rod, and also for transferring heat and also as a secure stage for the growing rod in the reactor. Since the trend is toward ever longer and heavier rods and the rod pairs, which in the meantime can have a weight of hundreds of kilograms, are only anchored by means of the electrodes in the reactor, precisely the choice of the shape and of the material constitution is very important.

Depending also on the subsequent use of the silicon rods thus produced, very different requirements are made of the silicon rods and the deposition process, and thus of the electrodes. If, by way of example, the polycrystalline silicon is subsequently used in silicon fragments for solar and electronics applications, the silicon rods must not fall over during or after the deposition process in the deposition reactor. Long and thick polycrystalline silicon rods increase the economic viability of the deposition process, but also the risk of falling over in the reactor.

Electrodes according to the prior art consist of a cylindrical base body in the lower part and a conical tip in the upper part. A cavity for receiving and making contact with the thin rod is provided at the conical tip. In this case, the lower end of the electrode is placed into a metallic electrode mount, via which the current is fed in. Such electrodes are generally known and are used for silicon deposition for example in U.S. Pat. No. 5,284,640.

Graphite is principally used as material for the electrodes since graphite can be produced with very high purity and is chemically inert under deposition conditions. Furthermore, graphite has a very low electrical resistivity.

U.S. Pat. No. 6,639,192 describes a graphite electrode having a conventional form. It consists of a cylindrical base body with a conical tip. The tip contains a hole for receiving and making contact with the thin rod. The electrode is produced from one part and thus from a material (here electrographite) having homogeneous material properties. It has a very high specific thermal conductivity, in particular. What is disadvantageous about this embodiment is a high rate of falling over before and during the deposition until the end diameter is attained.

DE 2328303 describes a cylindrical electrode without a tip. In this case, the carrier rod is inserted in a hole on a planar surface. This electrode form has a very high heat dissipation even in the case of a thin rod diameter on account of the fully cylindrical fall. In order that the rods with a thin diameter do not topple down during the deposition process, the electrode has to have a low heat dissipation, that is to say be of small diameter, and the electrode material has to have a very low specific thermal conductivity. Thick rods such as are usual nowadays cannot be deposited with this electrode form, since, on account of the small electrode diameter and the low specific thermal conductivity of the electrode material, the high energy necessary for thick rod diameters cannot be dissipated from the rod feet.

Graphite electrodes composed of a plurality of layers are known from other areas. However, in these cases, the arrangement of different layers is aimed at optimizing chemical conversions. U.S. Pat. No. 3,676,324 discloses for example a cylindrical graphite electrode consisting of a cylindrical inner and outer part, wherein the inner part has a very high electrical conductivity and the outer part is a porous graphite. The aim of this plurality of layers is to avoid high voltage losses and to obtain a high chemical conversion at the porous surface. A similar electrode having two different layers is known from GB 2135334, wherein here the outer porous layer serves for electrolytically obtaining fluorine.

What is disadvantageous about all the electrodes known from the prior art is that said electrodes, at the transition between electrode and the silicon rod or in the silicon rod in the vicinity of the electrode, tend to a greater or lesser extent to cracking or to chipping-off of material and thus make the silicon rod unstable.

Batches that have fallen over signify great economic damage. Thus, by way of example, in the event of the silicon rods falling over, damage to the reactor wall can occur. In this case, the silicon rods that have fallen over are contaminated by contact with the reactor and have to be cleaned on the surface. In addition, batches that have fallen over can only be demounted from the reactor with increased outlay. In this case, the surface of the silicon is contaminated further.

It was an object of the invention to provide an electrode with which the rate of falling over is significantly reduced by comparison with electrodes of conventional design.

It has surprisingly been found that an electrode composed of a plurality of different zones, consisting of materials having different thermal conductivities, does not have the disadvantages known from the prior art.

SUMMARY OF THE INVENTION

The invention relates to an electrode composed of carbon, wherein the electrode consists of at least two different zones having a different specific thermal conductivity, wherein an outer zone (A) forms the base of the electrode and carries one or more inner zones, wherein the innermost zone (B) projects from the zone (A) at the top and has a lower specific thermal conductivity than zone (A).

BRIEF DESCRIPTION OF THE DRAWINGS

The invention, together with objects and advantages thereof, may best be understood by reference to the following description together with the accompanying drawings in which.

DETAILED DESCRIPTION OF PREFERRED EMBODIMENTS

Figure 1:
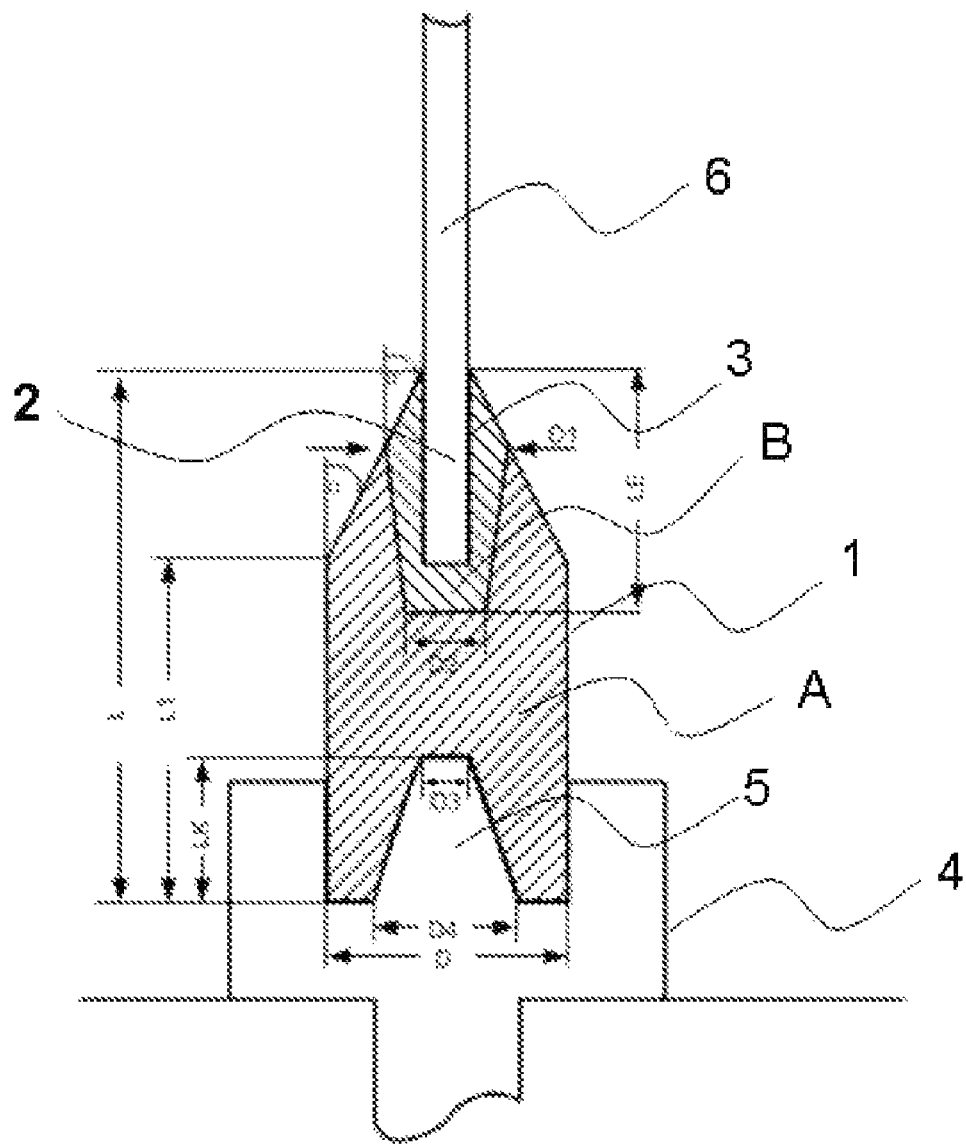
FIG. 1 shows an embodiment of an electrode according to the invention.

The electrode according to the invention consists of at least two parts, an electrode base (A) and at least one further inner zone (B) inserted into the said base. The electrode can additionally also have even further zones between the zone (A) and the zone (B), wherein the innermost zone receives and makes electrical contact with the thin rod. In this case, inserts and base are constructed from at least two different materials, wherein the innermost insert (zone (B)) consists of the material having the lowest thermal conductivity. The further inserts are produced from materials having higher specific thermal conductivities, wherein the specific thermal conductivity ideally rises from the inside toward the outside.

The electrode according to the invention can be used for all applications in which different specific thermal conductivities are required in the electrode and on the surface thereof. The electrode according to the invention is preferably used during the deposition of polysilicon.

By virtue of the classification into different zones composed of different materials and different thermal conductivities, the electrode can be optimally adapted to the different requirements during the growth of the material fixed thereon, for example of a silicon rod. At the beginning of growth and hence with thin rod diameters, the rod foot first grows only onto the insert having the lower thermal conductivity. Owing to the low heat dissipation via the insert (zone B), on account of the employed graphite having a low specific thermal conductivity, little heat is dissipated at the beginning of growth via the entire electrode and the electrode mount thereof and a high temperature at the connection of the electrode to the silicon rod is obtained with rod diameters still being thin. Colder regions at the rod foot, at which regions etching processes can occur on account of an excessively low temperature, are not present. The rod foot thus grows rapidly and without defects with the electrode tip in zone (B). Falling over with a thin rod diameter before or during the deposition process is completely prevented as a result. As the deposition process progresses and rods become thicker, the rod foot grows further via the insert (B) onto the base (A) and the base (A) grows into the rod foot. On account of the higher thermal conductivity of the base, the energy can be dissipated very well from the rod foot. The temperature gradient at the rod foot and thermal strains are thus greatly reduced. Cracks and break-offs on the rod foot occur to a significantly lesser extent.

The different zones of the inventive electrode can be directly incorporated during the production of the electrode or be embodied as a loose or changeable insert. If the electrode is produced from one piece, the transition of the different zones and materials can also be fluid.

The inner zone (B) is preferably embodied with a pointed tip toward the top and is inserted in the base by the end remote from the tip. The connection of the base to the insert can have a conical, cylindrical or any other form. In practice, a conical plug connection has proved to be worthwhile since a conical connection ensures that base and insert form a mechanically fixed connection and have a good thermal and electrical contact. An additive can also be introduced between the zones A and B in order to improve the conductivity.

That end of the insert which projects from the electrode forms the electrode tip. The latter has a device for receiving and making contact with the thin rod. The device can have a cylindrical, conical or any other form. Correspondingly, the thin rod end subsequently inserted in the deposition process has a cylindrical, conical or any other form matching the device.

Any electrode mounts known from the prior art can be used for receiving and making contact with the electrode according to the invention in the deposition reactor. In order to improve the heat dissipation of the entire electrode, the electrode mount can also have an additional heat sink, which is arranged at the lower end of the base and/or projects into the base. Said heat sink is generally part of the electrode mount and preferably produced from one piece with the electrode mount. All known materials composed of highly thermally and electrically conductive material, such as metal, for example, are suitable as materials. The heat sink is cooled by means of a suitable heat carrier, e.g. water. A very good thermal and electrical contact of the heat sink with the base is important in order that there is high electrical and thermal conductivity which is uniform over the extent of the insert. The form of the heat sink can be as desired; a cylindrical or conical form is preferred, and a conical form is particularly preferred.

The electrode according to the invention has made it possible to significantly improve the problem of rods falling over in the reactor simultaneously in the case of thick and thin rods. The rates of falling over during the deposition process both with a thin diameter and when the end diameter is attained and when the rods are cooled down are significantly reduced compared with the use of electrodes according to the prior art. Chipping-off on the rod feet virtually does not occur. In addition, compared with the electrodes known from the prior art, there is a low heat dissipation with a thin rod diameter and a very good growth behavior of the rod foot onto the electrode with a thin rod diameter. At the same time, the electrode according to the invention has a high heat dissipation with a thick rod diameter.

All known types of carbon which are suitable for use as electrodes can be used as material for the electrode according to the invention. For purity reasons, a high-purity electrographite having different thermal conductivities is preferably used. However, it is also possible to use other materials such as, for example, silicon carbide, carbon fiber reinforced carbon (CFC) composite materials, tungsten or other metals having a high melting point. A coating of the electrode with materials such as, for example, silicon, silicon carbide, silicon nitride, pyrocarbon, glassy carbon or silicene, i.e. nano silicon, is also possible. In this case, a layer thickness of less than 100 µm is preferred.

The specific thermal conductivity of the graphite material used, measured at room temperature according to DIN 51908, of the zone (A) of the electrode according to the invention is 80 to 200 W/(m*K), preferably 100 to 180 W/(m*K), and particularly preferably 130 to 160 W/(m*K). The specific thermal conductivity of the inner zone (B) is 20 to 100 W/(m*K), preferably 30 to 80 W/(m*K), and particularly preferably 30 to 70 W/(m*K).

The electrical resistivity of the graphite material used of the zone A of the electrode according to the invention, measured at room temperature according to DIN 51911, is between 15 and 5 µOhm*m, preferably between 10 and 6 µOhm*m, and particularly preferably between 9 and 7 µOhm*m. The electrical resistivity of the inner zone B is 30 to 10 µOhm*m, preferably 25 to 15 µOhm*m, particularly preferably 25 to 17 µOhm*m.

The arithmetic mean value of the surface roughness Ra of the graphite material used, measured according to DIN EN ISO 4287, of the electrode according to the invention is between 1 and 20 µm, preferably between 1 and 8 µm, particularly preferably between 1 and 5 µm, given a total height of the roughness profile Rt between 10 and 200 µm, preferably between 10 and 150 µm, particularly preferably between 10 and 100 µm, and an average roughness depth Rz between 8 and 160 µm, preferably between 8 and 120 µm, particularly preferably between 8 and 80 µm.

The compressive strength of the graphite material used, measured at room temperature according to DIN 51910, is between 40 and 250 MPa, preferably between 50 and 200 MPa, particularly preferably between 50 and 150 MPa.

The flexural strength of the graphite material used, measured at room temperature according to DIN 51902, is between 10 and 100 MPa, preferably between 15 and 80 MPa, particularly preferably between 20 and 70 MPa.

The modulus of elasticity of the graphite material used, measured at room temperature according to DIN 51915, is between 1 and 20 GPa, preferably between and 15 GPa, particularly preferably between 3 and 15 GPa.

The coefficient of linear thermal expansion of the graphite material used of the different zones, is in the temperature range of 20 to 1000° C., measured according to DIN 51909, is between $2*10^{-6}$ and $10*10^{-6}$ 1/K, preferably between $3*10^{-6}$ and $8*10^{-6}$ 1/K, particularly preferably between $3.5*10^{-6}$ and $7*10^{-6}$ 1/K.

The open porosity of the graphite material used, measured according to DIN 51918, is between 5 and 25%, preferably between 10 and 25%, particularly preferably between 10 and 20%.

FIG. 1 shows by way of example an embodiment of the electrode according to the invention. The base of the electrode forms the zone (A) embodied as a round body (1). At the upper end, said zone has a receptacle (2) for the inner zone (B), which has been illustrated with a conical connection between the zones by way of example in the figure. The outer zone and the insert together form a common cone forming the electrode tip. The tip of the inner zone (B) projecting from the outer zone (A) has a receptacle (3) for a filament rod (6). The electrode is seated on an electrode holder (4), which can optionally also be equipped with a cooling system. The heat sink can also extend (5) into the base of the electrode.

The height of the entire electrode (L), consisting of outer and inner zones, is 70 to 200 mm, preferably 70 to 150 mm, and particularly preferably 80 to 130 mm. The cylindrical length (L1) is 40 to 165 mm, preferably 45 to 100 mm, and particularly preferably 50 to 80 mm. The diameter of the electrode (D) is 30 to 100 mm, preferably 40 to 80 mm, and particularly preferably 45 to 70 mm.

The cone angle (α) is 15° to 40°, preferably 20° to 35°, and particularly preferably 22° to 32°.

The length of the insert (LE) is 30 to 90 mm, preferably 35 to 80 mm, and particularly preferably 35 to 65 mm.

The diameter of the insert (D1) at its widest location is 20 to 50 mm, preferably 25 to 45 mm, and particularly preferably 30 to 40 mm.

The diameter of the insert at its lower end (D2) is 15 to 40 mm, preferably 20 to 40 mm, and particularly preferably 20 to 35 mm.

The diameter of the heat sink is 10 to 60 mm, preferably 10 to 50 mm, and particularly preferably 10 to 45 mm, at the upper end (D3) and 10 to 60 mm, preferably 10 to 50 mm, and particularly preferably 10 to 45 mm, at the lower end (D4).

The length of the heat sink (LK) is 20 to 80 mm, preferably 20 to 60 mm, and particularly preferably 30 to 50 mm.

The invention will be explained in greater detail on the basis of the following examples.

Polycrystalline silicon rods having a diameter of 140 to 200 mm were deposited in a Siemens deposition reactor. A plurality of embodiments of electrodes were tested in the process. The parameters of the deposition process were identical in each case in all the experiments. The experiments differed only in the embodiment of the electrode. The deposition temperature was between 1000° C. and 1100° C. in the progression of the batch. A feed consisting of one or more chlorine-containing silane compounds of the formula $SiH_nCl_{4-n}$ (where n=0 to 4) and hydrogen as carrier gas was added during the deposition process.

COMPARATIVE EXAMPLE 1

Figure 2:
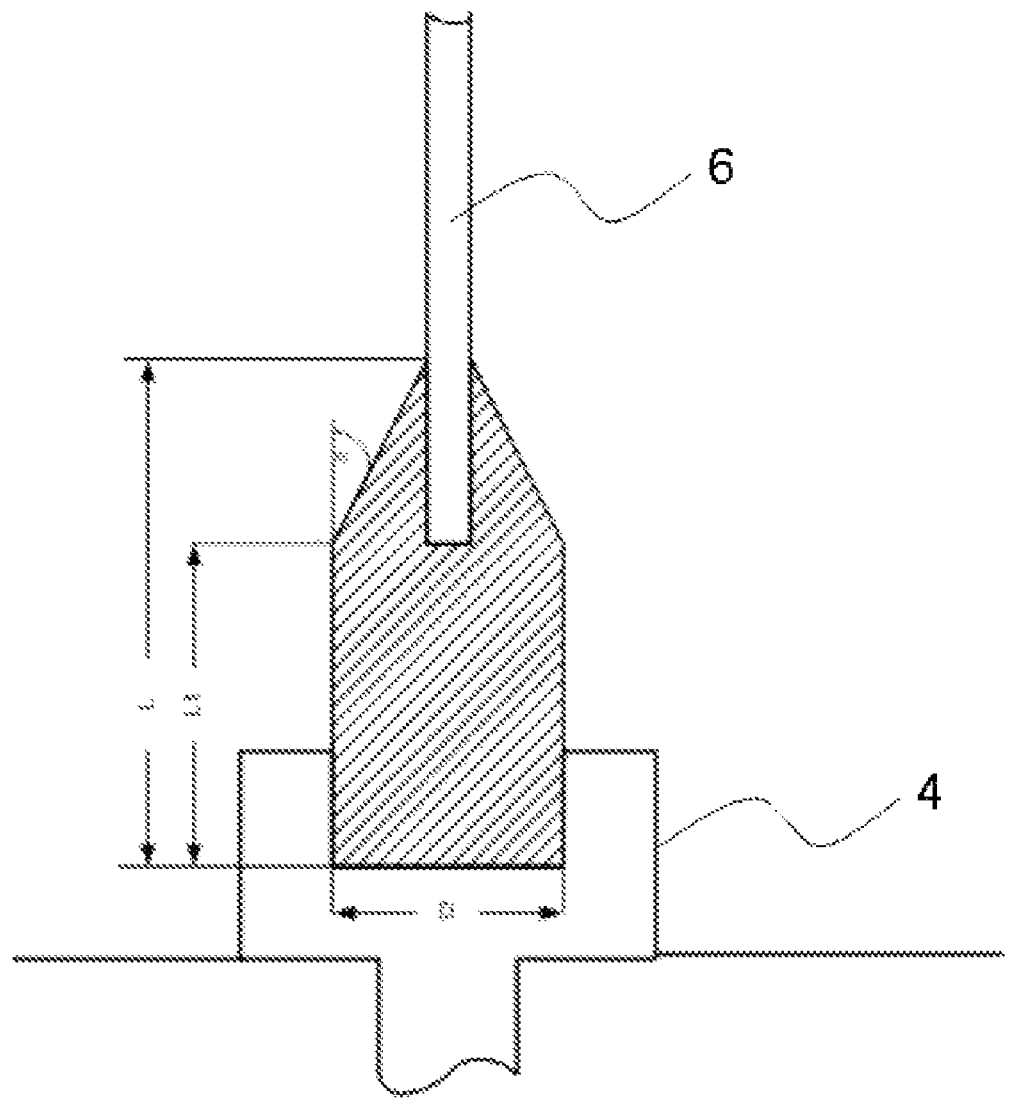
FIG. 2 shows a prior art electrode.

Electrodes according to the prior art were used for the deposition (FIG. 2). The electrodes used consisted of ultrahigh-purity electrographite having a specific thermal conductivity of 80 W/(m*K). The total length L was 118 mm and the cylindrical length (L1) was 72 mm. The cone angle (α) was 32° and the diameter (D) was 65 mm. An electrode without a heat sink was used.

At the end of the reaction, the reactor was opened and the number of batches with polysilicon rods that had fallen over was noted. Out of 100 batches, 20 batches had fallen over after attaining the end diameter.

COMPARATIVE EXAMPLE 2

Electrodes according to the prior art were used for the deposition (FIG. 2). The electrodes used consisted of ultrahigh-purity electrographite having a specific thermal conductivity of 150 W/(m*K). The total length L was 118 mm and the cylindrical length (L1) was 72 mm. The cone angle (α) was 32° and the diameter (D) was 65 mm. An electrode without a heat sink was used.

At the end of the reaction, the reactor was opened and the number of batches with polysilicon rods that had fallen over was noted. Out of 100 batches, 10 batches had fallen over before attaining the end diameter during the deposition and two batches had fallen over after attaining the end diameter.

EXAMPLE 1

Electrodes according to the invention comprising insert and heat sink were used for deposition (FIG. 1). Zone (A) of the electrodes used consisted of ultrahigh-purity electrographite having a specific thermal conductivity of 135 W/(m*K). An ultrahigh-purity electrographite having a specific thermal conductivity of 50 W/(m*K) was used for the inner zone (B).

The electrode had the following geometry:
Total length (L): 118 mm
Cylindrical length (L1): 72 mm
Cone angle (α): 32°
Diameter (D): 65 mm
Length of insert (LE): 46 mm
Diameter of insert (D1): 37 mm
Diameter of insert (D2): 22 mm
Diameter of heat sink (D3): 25 mm
Diameter of heat sink (D4): 45 mm
Length of heat sink (LK): 50 mm At the end of the reaction, the reactor was opened and the number of batches with polysilicon rods that had fallen over was noted. Out of 100 batches, 0 batches had fallen over during the deposition before attaining the end diameter and 3 batches had fallen over after attaining the end diameter.

What is claimed is:

1. An electrode comprised of carbon, wherein the electrode comprises at least two different zones having different specific thermal conductivities:
   (A) an outer zone forming a base of the electrode; and
   (B) at least one inner zone carried by the outer zone (A), projecting from a top of the outer zone (A) and having a specific thermal conductivity lower than a specific thermal conductivity of the outer zone (A).

2. The electrode as claimed in claim 1, wherein the at least two different zones are arranged in such a way that an innermost zone has the lowest specific thermal conductivity and is wholly or partly surrounded by a zone having a higher thermal conductivity.

3. The electrode as claimed in claim 1, wherein the at least one inner zone (B) is embodied as a loose or changeable insert.

4. The electrode as claimed in claim 3, wherein the at least one inner zone (B) is connected by means of a conical plug connection in the outer zone.

5. The electrode as claimed in claim 1, wherein the at least two different zones have a common thermal and electrical contact.

6. The electrode as claimed in claim 2, wherein the innermost zone having the lowest thermal conductivity has a device for receiving a filament rod.

7. The electrode as claimed in claim 1, wherein the electrode is coupled to a heat sink at the base.

8. The electrode as claimed in claim 1, wherein the electrode comprises high- or ultrahigh-purity electrographite having different thermal conductivities.

9. The electrode as claimed in claim 1, wherein the carbon has at least one of the following parameters:
   a) a specific thermal conductivity from 20 to 200 W/(m*K),
   b) an electrical resistivity 30 to 5 µOhm*m,
   c) an arithmetic mean roughness value of a surface roughness Ra 1 to 20 µm given a total height of the roughness profile Rt between 10 and 200 µm and an averaged roughness depth Rz between 8 and 160 µm,
   d) a compressive strength 40 to 250 MPa,
   e) a flexural strength 10 to 100 MPa,
   f) a modulus of elasticity 1 to 20 GPa,
   g) a coefficient of linear thermal expansion in a temperature range 20 to 1000° C., $2*10^{-6}$ to $10*10^{-6}$ 1/K, and
   h) an open porosity 5 to 25%.

10. A method for producing polycrystalline silicon by depositing high-purity elemental silicon from a gas phase on a surface of silicon rods, wherein the silicon rods are held in a reactor by electrodes as claimed in claim 1.

* * * * *